Patented Oct. 23, 1951

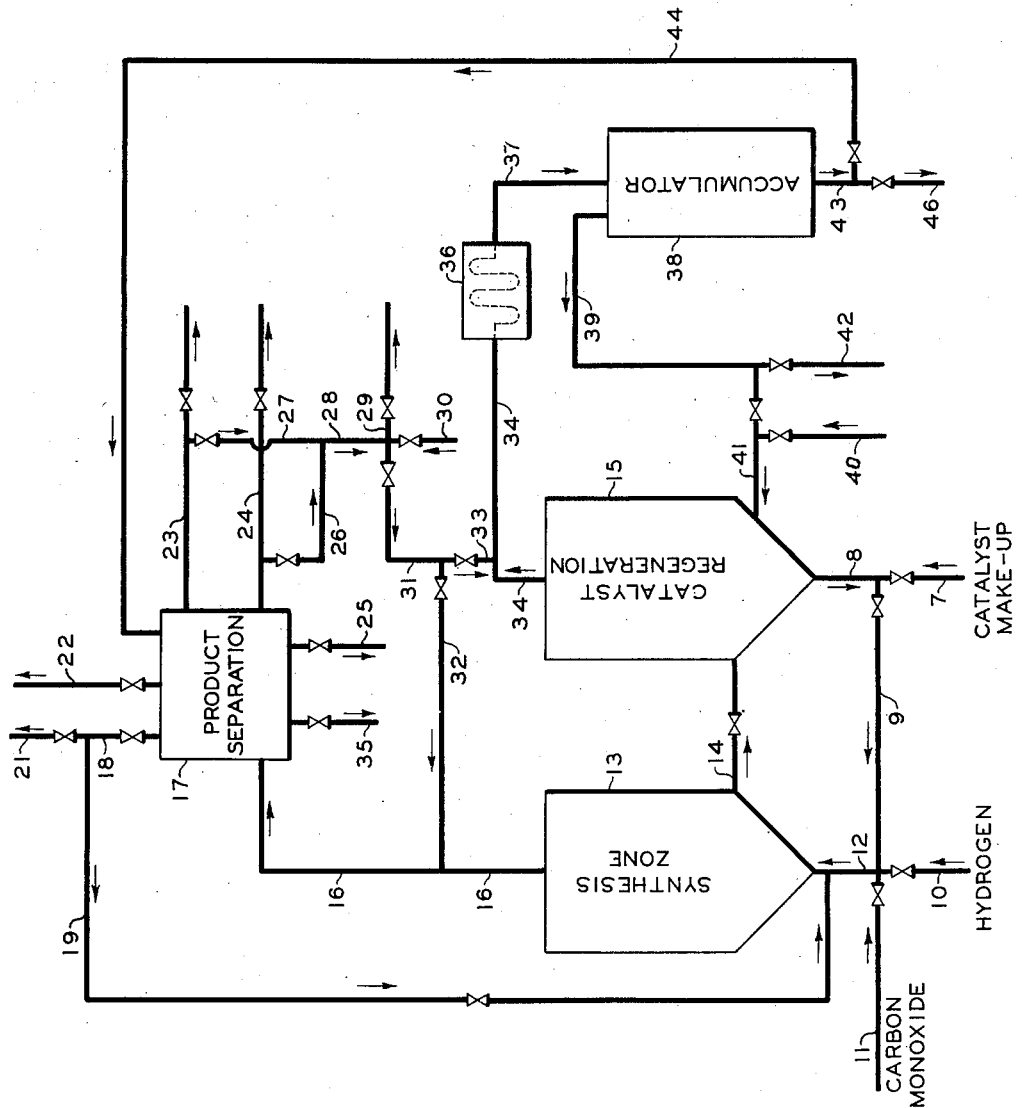

2,572,633

UNITED STATES PATENT OFFICE 2,572,633

PREVENTION OF SOLID DEPOSITS IN FISCHER-TROPSCH PLANT LINES

William C. Lanning, Bartlesville, Okla., assignor to Phillips Petroleum Company, a corporation of Delaware Application September 10, 1948, Serial No. 48,718

8 Claims. (Cl. 260—449.6)

This invention relates to the synthesis of hydrocarbons and oxygen-containing materials from carbon monoxide and hydrogen, in the presence of a catalyst. In one aspect, this invention relates to the regeneration of a catalyst at least partially spent in a catalytic process for the synthesis of hydrocarbons and oxygen-containing compounds, from carbon monoxide and hydrogen. This invention also relates to a method for preventing the accumulation of solid materials in the lines and vessels down stream from the zone of catalyst regeneration, in a system for manufacturing hydrocarbons and oxygen-containing compounds from carbon monoxide and hydrogen, in the presence of a fluidized synthesis catalyst. In another embodiment, this invention relates to a method for preventing the accumulation of solid materials, down stream from the synthesis zone, in a system for manufacturing hydrocarbons and oxygen-containing compounds, from carbon monoxide and hydrogen in the presence of a fluidized synthesis catalyst.

In processes of the Fischer-Tropsch type, in which carbon monoxide and hydrogen are reacted in the presence of a catalyst to form hydrocarbons and oxygenated compounds, the product contains hydrocarbons ranging in molecular complexity from methane to wax. In this type of process, operation with a fluidized catalyst is most preferably employed. When so operating, feed gas comprising hydrogen and carbon monoxide, is passed into the bottom of an elongated vertical reactor, and flows upwardly through a mass of finely divided catalytic material, maintained at the desired synthesis reaction temperature. The velocity of the influent gas maintains the catalytic material in a fluidized condition with the effluent gas being relatively catalyst-free.

The volatility of the heavy product compounds is low, and difficulty is frequently encountered in continuous operation of the synthesis process, due to their condensation and accumulation in the effluent lines from the zone of the synthesis reaction. The accumulation usually results from the presence in the effluent, of wax product, small quantities of catalyst fines, and carbon particles which are carried mechanically out of the synthesis zone in the gas effluent. Heavy product and finely divided solids thus collect together on the walls of the effluent lines in a dense layer which leads eventually to high pressure drop and complete obstruction.

During the course of the synthesis reaction, wax accumulates on the catalyst surface until it impairs the activity of the catalyst to such an extent that wax removal is necessary. In accordance with practice known to the art, when sufficient wax has accumulated on the catalyst to impair its activity, it is treated with a regenerating gas, preferably hydrogen or hydrogen-containing gases at an elevated temperature, to remove the wax. The regeneration can be carried out in alternate cycles with the synthesis reaction, whereby the catalyst is regenerated in situ. However, it is usually preferable to regenerate the partially spent synthesis catalyst by treating a continuous catalyst side stream with hydrogen-containing gases in a separate regeneration zone. Such a catalyst regeneration is usually conducted by introducing the hydrogen regenerating gas into the bottom of the regeneration chamber and passing the gas upwardly through the mass of finely divided catalyst material maintained at the desired regeneration temperature level. Regardless of the particular regeneration process employed, appreciable high molecular weight wax and wax-like products are driven off the catalyst and are present in the effluent regeneration gas as a finely dispersed fog, which is not completely trapped by ordinary cooling and accumulator means. Such heavy product fog is carried, along with small catalyst fines and carbon particles, into the lines and vessels down stream from the catalyst regeneration zone, and eventually condenses and accumulates in the down stream system, particularly in the lines to control instruments, and ultimately in main flow lines, and in general, fouling the entire recycle system, necessitating expensive shut-downs for cleaning.

This invention is concerned with the elimination of such a deposition and accumulation of solid materials in the lines and vessels down stream from the synthesis and catalyst regeneration zones in a catalytic process of the Fischer-Tropsch type.

An object of this invention is to provide a continuous catalytic process for the synthesis of hydrocarbons and oxygenated compounds from carbon monoxide and hydrogen.

Another object is to prevent the accumulation of solids in the lines and vessels down stream from the synthesis zone in a process of the Fischer-Tropsch type.

Another object is to prevent the accumulation of solids in the lines and vessels down stream from the catalyst regeneration zone in a process of the Fischer-Tropsch type.

It is still another object of this invention to utilize, in a Fischer-Tropsch type process, a product fraction for preventing the accumulation of solid materials in lines and vessels down stream from the synthesis and catalyst zones.

Other objects will become apparent to one skilled in the art from the accompanying discussion and disclosure.

In accordance with this invention, in a system for catalytically reacting hydrogen with carbon monoxide to form liquid hydrocarbons, and oxygenated product, the condensation and accumulation of solid materials in the lines and vessels down stream from the synthesis and/or catalyst regeneration zone is prevented by the injection of a selected hydrocarbon fraction, more preferably a selected product fraction, into the effluent line from the synthesis zone, or the catalyst regeneration zone, as the case may be. The selected fraction is of such boiling range that it is normally liquid, and is at least partially vaporized upon coming in contact with the hot effluent gases. The effluent gas containing the vaporized portion of the product fraction thus added is cooled sufficiently to condense the vaporized product, and the wax-like material dispersed in the effluent gas is carried down with the condensing material. The condensed heavy product, carried down with the condensing normally liquid added material, facilitates the movement of the wax through the system and prevents the formation of or removes the fog which is otherwise normally formed.

Usually, I prefer to inject a selected product fraction into the effluent line, since such a fraction has a high solvent power for the wax and wax-like Fischer-Tropsch product, and because it can be recovered from the effluent gas by separation means already in the Fischer-Tropsch System, whereby unnecessary equipment, and separation steps are eliminated.

The selected fractions employed herein, usually boil in a range within the limits of 100 and 500° F. However, more often a selected fraction having a boiling range within the limits of about 200-400° F. is utilized. The selection of a specific fraction is dependent largely upon the hot effluent gas temperature, and the amount of such a selected fraction to be utilized depends upon the concentration of the dispersed materials in the effluent, and the concentration of any other materials therein, such as synthesis product.

Usually the selected fraction has a boiling range such that at least a portion of it is readily vaporized upon contacting the hot effluent but readily condensed down stream from the point of contact. For example, when operating with a hot effluent gas temperature of about 700° F., a selected fraction boiling in the range of about 300-400° F. would be used advantageously. The molar quantity of the selected fraction added is usually within the limits of from 1 to 50% of the effluent gas. Often from about 2 to 20 per cent of such a selected fraction is sufficient when injected into synthesis effluent, whereas from 10 to 50% may be required when injected into catalyst regeneration effluent. Upper or lower values in such ranges are obviously dependent upon the factors already discussed.

In order to more clearly illustrate my invention, reference is made to the following description in which preferred modifications of my process are specifically disclosed. It is understood, however, that minor variations and departures may be necessary in adapting my process to the various conditions within the scope of my invention. The figure is diagrammatic of apparatus in which the process of my invention may be practiced. It is to be understood that the flow diagram is diagrammatic only and may be altered in many respects by those skilled in the art, and yet remain within the intended scope of my invention.

In the figure is illustrated an embodiment of my invention in which the synthesis reaction and the catalyst regeneration are conducted in separate zones. Referring then to the figure, hydrogen from line 10 and carbon monoxide from line 11 are admixed in line 12 in a hydrogen to carbon monoxide mol ratio within the range of 1.7:1 to 2.3:1, preferably about 2:1, and the resulting admixture introduced to the lower portion of synthesis zone 13 which contains a promoted iron catalyst having a mesh size within the limits of 80 to 400 mesh, at a space velocity within the limits of 1500 to 3500 standard gas volumes per catalyst volume per hour. Under such reaction conditions of catalyst particle size and space velocity, the catalyst in zone 13 is maintained in a fluidized, dense phase suspension. Synthesis zone 13 is maintained at a temperature within the limits of 560-620° F. and at a pressure within the range of 5 to 30 atmospheres. Total effluent from zone 13 is passed through line 16 to product separation means 17. The total product is predominantly hydrocarbon, along with a smaller amount of oxygenated organic compounds and a large amount of water. Separation zone 17 comprises coolers, separators, distillation equipment, storage tanks, and the like, not individually illustrated, which can be used to effect a separation of various selected product fractions. Tail gas comprising hydrogen, carbon monoxide and carbon dioxide is withdrawn through line 18 and recycled to synthesis zone 13 through line 19, or withdrawn in part or in whole as desired, through line 21. The preferred molar ratio of recycle tail gas to fresh gas charge, is usually within the range of 2:1 to 5:1. A normally gaseous hydrocarbon stream is withdrawn from zone 17 through line 22. A gasoline stream is withdrawn from zone 17 through line 23 and a gas-oil stream boiling above approximately 400° F. is withdrawn through line 24. A fraction of further selected boiling range is provided by withdrawing gas-oil product from line 24 through line 26, withdrawing gasoline product from line 23 through line 27 and admixing the materials from lines 26 and 27 in line 28. Materials from lines 23 and 24 may be passed through line 28 separately, if desired. Selected product in line 28 is withdrawn, if desired, through line 29 or passed to line 31 for utilization described later in this specification. Wax and other heavy materials are withdrawn from zone 17 through line 25. Water is withdrawn through line 35.

During operation of the synthesis step, high molecular weight wax and wax-like product accumulates on the catalyst surface and, after a period of time, such an accumulation is so great as to impair fluidization of the catalyst and to cause the catalyst activity to decrease to an undesirably low level. In order to maintain a desired level of catalyst activity and a constant state of catalyst fluidization in synthesis zone 13, a continuous catalyst side stream may be passed from zone 13 through line 14 to catalyst regeneration zone 15 and therein contacted with a regeneration gas, preferably hydrogen or a hydrogen-containing gas. Fresh regeneration gas is introduced to the lower portion of catalyst regeneration zone 15 through line 40 and passed upwardly through the partially spent catalyst at a temperature not lower than the synthesis temperature in zone 13, and usually not exceeding 900° F. Preferably, the space velocity of the influent gas in zone 15 is maintained at a rate sufficient to maintain the catalyst in the fluidized state. Effluent catalyst regeneration gas is passed from zone 15 through line 34. In regeneration zone 15, appreciable quantities of high molecular weight product are driven from the catalyst and condense as a finely dispersed fog which is carried from the regeneration zone in the effluent regeneration gas. The finely dispersed fog consists of minute liquid drops, and solid particles of wax and wax-like product. Carbon particles and catalyst fines are often entrained in the product fog, which is not sufficiently arrested, by usual condensing means. The fog dispersion consequently moves into lines and vessels down stream from the regeneration zone with the concomitant deposition and accumulation of solids, causing fouling and eventual plugging, thus necessitating interruptions in the process, for cleaning. In order to arrest the finely dispersed fog, normally liquid product fraction from line 31, of a selected boiling range such that it is at least partially vaporized upon contacting the hot regeneration effluent gas, is added through line 33 to the regeneration effluent in line 34. The resulting admixture in line 34 is usually cooled to an extent whereby at least a portion of the product vapors, cool and condense, carrying down with them finely dispersed waxy product materials and other solid removed from the regeneration zone in the effluent regeneration gas. Recondensation of the vaporized portion of the selected product fraction has the effect of carrying down all the waxy material removed from the catalyst, much of which would otherwise form a difficulty-recoverable fog of fine droplets. In most instances, depending on the particular heat transfer conditions through line 34, the condensation of the product fraction is complete upon entering condenser 36. However, any remaining vaporous product fraction is condensed in zone 36. Condensate and gases from zone 36 are passed through line 37 to accummulator 38. Hydrogen off-gas is passed overhead from accumulator 38 through line 39 and recycled either to regeneration zone 15 through line 41 or discharged for further utilization through line 42. Liquid product from accumulator 38 is withdrawn through line 43 and recycled to separation zone 17 through line 44, or if desired, withdrawn from line 43 through line 46. Regenerated catalyst is recycled from regeneration zone 15 through lines 8 and 9 to synthesis zone 13. Make-up catalyst is introduced to the system through line 7. Any product fraction from zone 13, obtained from zone 17 by means other than that illustrated, or any desired hydrocarbon fraction from an external source may be introduced to line 31, through line 30, and utilized as the selected fraction. In some cases it is desirable to refractionate one or more of the fractions from separation zone 17 in apparatus not shown and to introduce therefrom a fraction of different boiling range through line 30.

When a mechanical cleaning action in line 34 is desired, the selected product fraction from line 33 may be injected into line 34 through a plurality of separate nozzles. It is also within the scope of the invention to introduce the fraction as a spray to serve as a quench.

In another embodiment of my invention, a selected product fraction is introduced to the synthesis effluent during the production of high wax-content synthesis product. This is advantageous when forming a synthesis product containing for example, from 5 to 10 per cent or more of high molecular weight wax, or wax-like material. Under such conditions of operation, a difficulty-recoverable fog of liquid droplets of such heavy product is formed, and is carried from the synthesis zone in the gas effluent, presenting problems already described, i. e., the fog not arrested by ordinary condensing means, permeats the entire system down stream from the reactor and condenses and accumulates throughout the system so that after a period of time, lines and controls are fouled and/or plugged to the extent that a shut-down for cleaning is necessitated. Referring again to the figure, the synthesis in zone 13 is conducted within the various ranges of conditions already disclosed herein, to form a high wax-content product. In accordance with my invention, total effluent passed from zone 13, through line 16, is admixed with a selected synthesis product fraction from line 32, of the type already described, i. e., a fraction, preferably a product fraction, of selected boiling range such that it is at least partially vaporized when contacted with hot effluent gases in line 16. The resulting admixture is passed through line 16 to product separation means 17, described earlier in this specification. In most instances depending on the particular heat transfer through the walls of line 16, condensation of the vaporous product fraction is complete upon entering zone 17. However, any remaining vaporous product fraction is condensed in zone 17. Recondensation of the vaporized portion of the selected product fraction in line 16, as already mentioned, has the effect of carrying down all the finely dispersed wax and wax-like material, much of which would otherwise form a difficulty-recoverable fog of fine droplets. Selected product fraction from zone 17 may be returned through lines 28, 31 and 32 for admixture with material in line 16. Any product fraction from zone 13, obtained from zone 17 by means other than that illustrated, or any desired hydrocarbon fraction from an external source may be introduced to line 32 through line 30 and utilized as the selected fraction.

In another embodiment of my invention a selected product fraction may be used to prevent the deposition and accumulation of heavy wax and wax-like product in lines, valves, vessels, etc., down stream from the synthesis zone, when the catalyst is regenerated in situ. This may be illustrated by further reference to the figure. The synthesis in zone 13 is terminated when the catalyst activity decreases to below a predetermined level, or it may be terminated at the end of a predetermined time cycle. Subsequent to termination of the synthesis in zone 13, hydrogen from line 10 is introduced through line 12 to zone 13, in the absence of carbon monoxide, and contacted therein with the partially spent catalyst under catalyst regeneration conditions similar to those maintained in zone 15, previously described herein, in connection with another embodiment of my invention. Regeneration effluent gas from zone 13 is passed through line 16 and admixed with a selected product fraction of the type already described, from line 32. If for any reason it is desired to introduce the selected product fraction independently of separation zone 17, such fraction may be introduced to line 32 through lines 30 and 31. Also, any desired hydrocarbon fraction from an external source may be introduced through lines 30 and 31 to line 32. Upon contact of the selected fraction with the hot effluent regeneration gas in line 16, at least a portion thereof is vaporized. The vaporized portion of the product from line 32 often condenses, at least partially, during its flow through line 16. In many instances, depending upon the particular conditions of heat transfer through the walls of line 16, the condensation of the product fraction is complete upon entering zone 17. The condensation of vaporous product fraction in line 16 has the effect of carrying down all the waxy material removed from the catalyst, much of which would otherwise form a difficultly-recoverable fog of fine droplets. Hydrogen off-gas may be withdrawn from zone 17 through line 18 and either recycled to zone 13 through line 19 or withdrawn in part or in whole, as desired, through line 21. Wax product is withdrawn through line 25. Recovered product fraction separated in zone 17 may be withdrawn through lines 26 and/or 27 and recycled to line 16 through lines 31 and 32, or withdrawn in part or in whole, as desired, through line 29.

For convenience and clarity certain apparatus such as pumps, surge tanks, valves, etc. have not been shown in the drawing. Obviously such modifications of the present invention may be practiced without departing from the scope of the invention.

Advantages of this invention are illustrated by the following example. The reactants and their proportions and other specific ingredients are presented as being typical and should not limit the invention unduly.

Example

A promoted iron fluidized catalyst, used for carrying out conversion of hydrogen and carbon monoxide to predominantly hydrocarbons above methane together with minor amounts of oxygenated product, after having been "on-stream" for a few days at synthesis conditions of 565° F. and 250 p. s. i. g., became so fouled with waxy product that fluidization of the catalyst was impaired. Efficiency of transfer of the high exothermic heat of reaction to the reactor walls was reduced sharply, and close control of temperature of the catalyst bed became difficult.

In order to eliminate the wax and otherwise to regenerate the catalyst effectively, the hydrogen-carbon monoxide feed of fresh synthesis gas was cut off, and essentially pure hydrogen was fed until the carbon monoxide was almost completely flushed from the system. Reaction pressure was maintained, and recycle of effluent gas was continued to maintain catalyst fluidization. When the carbon monoxide was eliminated, the temperature of the catalyst was raised to about 750° F., by means of heaters surrounding the reactor. Under these conditions, wax was effectively removed from the catalyst, and the catalyst performance was restored to normal. However, since only a very small amount of condensible product was contained in the reactor effluent during this regeneration process, and this product was relatively high boiling material, a difficultly separable "fog" of liquid and/or solid droplets was formed, and only a portion of the product was actually collected in the intended condenser and accumulator. This "fog" permeated the entire recycle system, including, particularly, lines to control instruments, so that after a few such regenerations, usually from one to ten, blocking of control lines occurred, and there were troublesome accumulations in main flow lines.

In another operation, regeneration of the catalyst was carried out in the same manner, except that a 200–300° F. cut of the liquid product from normal operation of a Fischer-Tropsch synthesis zone was injected at a suitable rate into the reactor effluent line ahead of the cooling condenser. The rate of this injection was so adjusted that an appreciable fraction of the injected liquid was volatilized by direct heat exchange with the hot effluent gas. This evaporated material was re-condensed, and carried down with it the small amount of heavy product present in the stream. In addition, the washing action of this condensed liquid and of the un-volatilized injected liquid prevented accumulation of waxy deposits in the lines and condenser. The usually troublesome "fog" was effectively eliminated, and no accumulations occurred in lines down-stream from the zone of catalyst regeneration.

As will be evident to those skilled in the art, various modifications of this invention can be made, or followed, in the light of the foregoing disclosure and discussion, without departing from the spirit or scope of the disclosure or from the scope of the claims.

I claim:

1. In a process for the hydrogenation of carbon monoxide to produce hydrocarbons and oxygenated product in the presence of a fluidized catalyst which becomes deactivated by a deposition thereon of products of the reaction and which is regenerated upon being contacted with a gas at elevated temperatures with the concomitant formation of finely dispersed solid and liquid materials carried from the regeneration zone in the effluent regeneration gas and the deposition and accumulation of same in the system down stream from the catalyst regeneration, the method of preventing such an accumulation of solid materials which comprises admixing with the regeneration effluent gas a product fraction of said hydrogenation which is at least partially vaporized upon contacting said effluent, subsequently cooling the resulting admixture to a temperature at which the vaporized portion of said product fraction condenses from the admixture, whereby a liquid medium is formed which contains said concomitantly formed materials, and removing said liquid medium from the system.

2. In a process for the hydrogenation of carbon monoxide to produce hydrocarbons and oxygenated product in the presence of a fluidized catalyst which becomes deactivated by a deposition thereon of products of the reaction and which is regenerated upon being contacted with a gas at elevated temperatures with the concomitant formation of finely dispersed solid and liquid materials carried from the regeneration zone in the effluent regeneration gas and the deposition and accumulation of same in the system down stream from the catalyst regeneration, the method of preventing such an accumulation of solid materials which comprises admixing with the regeneration effluent gas a hydrocarbon fraction which is at least partially vaporized upon contacting said effluent, subsequently cooling the resulting admixture to a temperature at which a vaporized portion of said hydrocarbon fraction condenses from the admixture, whereby a liquid medium is formed which contains said concomitantly formed materials, and removing said liquid medium from the system.

3. The process of claim 1 wherein said product fraction has a boiling range within the limits of 100 to 500° F.

4. In the catalytic synthesis of hydrocarbons from a gaseous mixture comprising hydrogen and carbon monoxide wherein finely divided catalyst is suspended in an upward flowing gaseous reaction mixture and wherein the velocity of said gaseous mixture is sufficient to maintain said catalyst in a fluidized dense phase suspension, wherein said catalyst becomes at least partially deactivated by deposition thereon of high boiling product of the synthesis reaction and thereafter is regenerated upon being contacted with a hydrogen-containing gas at an elevated temperature with the concomitant separation of high boiling product carried from the regeneration zone in the effluent regeneration gas in a state of finely divided dispersion together with solid carbon particles and catalyst fines, and wherein said dispersed materials deposit throughout the system down stream from the zone of catalyst regeneration to form undesirable accumulations of solids, the method of preventing such an accumulation, which comprises admixing with effluent regeneration gas a normally liquid synthesis product fraction which is at least partially vaporized when so admixed, cooling the resulting admixture to a temperature at which the vaporized portion of said product fraction condenses whereby a liquid medium is formed which contains said dispersed materials originally present in the effluent regeneration gas, and removing said medium from the system.

5. In the catalytic synthesis of hydrocarbons from a gaseous mixture comprising hydrogen and carbon monoxide wherein finely divided catalyst is suspended in an upward flowing gaseous reaction mixture and wherein the velocity of said gaseous mixture is sufficient to maintain said catalyst in a fluidized dense phase suspension, wherein said catalyst becomes at least partially deactivated by deposition thereon of high molecular weight product of the synthesis reaction and thereafter is regenerated upon being contacted with a hydrogen-containing gas at an elevated temperature with the concomitant separation of high boiling product carried from the regeneration zone in the effluent regeneration gas in a state of finely divided dispersion, and wherein said dispersed product deposits throughout the system down stream from the zone of catalyst regeneration to form undesirable accumulations, the method of preventing such an accumulation, which comprises admixing with effluent regeneration gas a normally liquid synthesis product fraction at least partially vaporized when so admixed, cooling the resulting admixture to a temperature at which the vaporized portion of said product fraction condenses whereby a solution of said product fraction and said dispersed product is formed, and removing said solution from the system.

6. A process for the hydrogenation of carbon monoxide to produce hydrocarbons and oxygenated compounds, comprising introducing hydrogen and carbon monoxide in a mol ratio of hydrogen to carbon monoxide within the limits of 1.7:1 to 2.3:1 to the lower portion of a synthesis zone containing finely divided catalyst in suspension, at a space velocity sufficient to maintain said catalyst in a fluidized state, maintaining temperature and pressure conditions in said synthesis zone suitable for the formation of said hydrocarbon and oxygenated product, said catalyst becoming partially spent due to the accumulation of wax product on its surface, passing hydrogen in contact with the partially spent catalyst at a temperature at least equal to that of said hydrogenation and not higher than about 900° F., whereby said catalyst is regenerated and said wax product is removed from the zone of regeneration in the effluent regeneration gas, admixing with said effluent regeneration gas a normally liquid synthesis product fraction at least partially vaporized when in such admixture, cooling the resulting admixture to a temperature at which the vaporized portion of said product fraction is condensed whereby a solution of said product fraction and said wax is formed, removing said solution from the system, and recovering hydrocarbons and oxygenated compounds from the effluent of said hydrogenation as a product of the process.

7. An improved process for continuously hydrogenating carbon monoxide in the presence of a catalyst to produce hydrocarbons and oxygen-containing compounds which comprises introducing hydrogen and carbon monoxide in a hydrogen to carbon monoxide mol ratio within the limits of 1.7:1 to 2.3:1 to the lower portion of a synthesis zone containing an iron catalyst having a mesh size within the limits of 80 and 400, at a space velocity within the limits of 1500 to 3500 standard gas volumes per catalyst volume per hour, at a temperature within the limits of 560 to 620° F., and at a pressure within the limits of 5 to 30 atmospheres; passing effluent from said synthesis zone to a product separation means and therein separating said effluent into selected product fractions, wax product accumulating on the catalyst surface during said hydrogenation whereby said catalyst becomes at least partially spent, passing partially spent catalyst from said synthesis zone to a catalyst regeneration zone, in said regeneration zone passing hydrogen in contact with the partially spent catalyst at a temperature within the limits of 600 to 900° F., whereby said wax is removed from the catalyst surface and passed in a finely divided state of dispersion from the regeneration zone in the regeneration effluent gas, admixing with said regeneration gas a normally liquid selected product fraction which is at least partially vaporized upon being so admixed, when the resulting admixture is passed through the lines down stream from the zone of said regeneration cooling said admixture to a temperature at which a vaporized portion of said selected product fraction condenses whereby a solution of said selected product fraction and said wax product is formed, passing the cooled admixture to a separating means wherein hydrogen and a wax-containing fraction are separated, recycling at least part of said hydrogen to the catalyst regeneration zone, passing said wax-containing fraction to a wax separation means and therein separating the product fraction from the wax, recycling regenerated catalyst from said regeneration zone to said synthesis zone, and separately recovering wax and said selected product fraction from said wax separation means.

8. In a process for the hydrogenation of carbon monoxide to produce hydrocarbons and oxygenated product in the presence of a fluidized catalyst which becomes deactivated by a deposition thereon of products of the reaction and which is regenerated upon being contacted with a gas at elevated temperatures with the concomitant formation of finely dispersed solid and liquid materials carried from the regeneration zone in the effluent regeneration gas and the deposition and accumulation of same in a line conducting the flow of effluent from the zone of catalyst regeneration, the method of removing said finely dispersed particles from the effluent regeneration gas and preventing such an accumulation of solid materials which comprises admixing with the effluent in said effluent line, a hydrocarbon fraction having a boiling range within the limits of 200 to 400° F., in an amount within the limits of 10 and 50 mol per cent based on the amount of said effluent, whereby at least a portion of said fraction is vaporized upon contacting said effluent cooling the resulting admixture in said line to a temperature at which a vaporized portion of said hydrocarbon fraction condenses, whereby dispersed particles of said wax product in said effluent are carried down with a condensing portion of said hydrocarbon fraction and a liquid medium is formed which contains said concomitantly formed solid materials, and removing such liquid medium from said line.

WILLIAM C. LANNING.

REFERENCES CITED

The following references are of record in the file of this patent:

UNITED STATES PATENTS

| Number | Name | Date |
|---|---|---|
| 2,448,279 | Rubin | Aug. 31, 1948 |
| 2,470,216 | Keith | May 17, 1949 |